March 25, 1958  F. W. ANDERS  2,827,963
PERFORATING MACHINE
Filed Dec. 3, 1954  7 Sheets-Sheet 1

Fig-1

INVENTOR
FREDERICK W. ANDERS
BY
ATTORNEY

March 25, 1958  F. W. ANDERS  2,827,963
PERFORATING MACHINE
Filed Dec. 3, 1954  7 Sheets-Sheet 2

INVENTOR
FREDERICK W. ANDERS
BY
John O Darley
ATTORNEY

March 25, 1958 F. W. ANDERS 2,827,963
PERFORATING MACHINE
Filed Dec. 3, 1954 7 Sheets-Sheet 6

INVENTOR
FREDERICK W. ANDERS
BY
ATTORNEY

March 25, 1958 — F. W. ANDERS — 2,827,963
PERFORATING MACHINE
Filed Dec. 3, 1954 — 7 Sheets-Sheet 7

INVENTOR
FREDERICK W. ANDERS
BY
ATTORNEY

United States Patent Office 2,827,963
Patented Mar. 25, 1958

2,827,963
PERFORATING MACHINE

Frederick W. Anders, Danville, Ill., assignor to Allith-Prouty, Inc., Danville, Ill., a corporation of Illinois Application December 3, 1954, Serial No. 472,877

6 Claims. (Cl. 164—114)

My invention relates to a perforating machine and more particularly to an arrangement for cutting perforations in a flat sheet or plate, metallic or otherwise, and wherein the marginal outline of the perforation group may be varied to provide differing patterns.

Specifically, the invention is concerned with cutting a plurality of perforations in a flat plate wherein the perforations are arranged in spaced, parallel rows extending across the length or width of the plate and in which the perforations in each row may or may not be staggered with reference to those in the immediately adjacent rows. In a perforated plate of this type, it is desirable for some applications that the number of perforations in successive rows shall vary according to a selected plan so that the marginal outline of the entire perforation group is irregular.

Present methods of making a plate of this type consist in either individually drilling or punching each perforation which is economically objectionable, or in employing a machine having a row of aligned punches which are activated by a suitable ram. A machine of this type is satisfactory where the number of apertures in each row is the same, but if the number varies in the different rows, it will be apparent that the machine must be stopped after punching a row, for example, to manually disable such punches as it is desired to eliminate for the next row. Such a scheme of operation is not conducive to a high production rate and so increases the unit cost of each plate.

It is therefore one object of the invention to provide a perforating machine for cutting a plurality of spaced, parallel rows of perforations in a flat plate and which may be adjusted initially so that the number of perforations in selected rows may be automatically varied as the plate proceeds through the machine.

A further object is to provide a machine of the character indicated which incorporates an arrangement for counteracting the stresses set up in any row area of the plate during punching to prevent deformation in this area and to substantially preserve the flatness of the plate.

A further object is to provide in the above machine mechanism for automatically lifting the plate following each punching operation to insure that the burred side of the plate will clear the dies as the plate is advanced to the next punching position.

These and further objects of the invention will be set forth in the following specification, reference being had to the accompanying drawings, and the novel means by which said objects are effectuated will be definitely pointed out in the claims.

Figure 14:
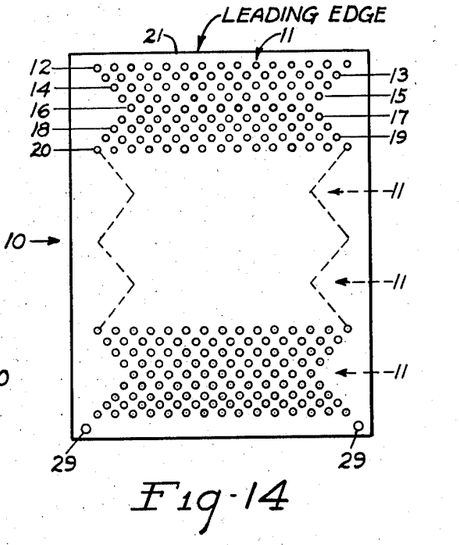
Fig. 14 is a plan view showing a typical perforated plate as produced by the machine, the perforation arrangement being representative and not restrictive.

Referring to Fig. 14, there is illustrated an apertured plate showing a characteristic aperture pattern as produced by the machine. The latter will be described as adjusted and arranged to produce this particular pattern, but from the subsequent explanation, it will become obvious that this pattern may be varied as desired.

The numeral 10 indicates the original plate which may have any marginal outline, but, for convenience, is shown as having a rectangular shape. The particular perforation arrangement shown may be considered as consisting of subgroups 11, each including spaced, parallel perforation rows 12 to 20, inclusive, which extend across the width of the plate parallel to the leading edge 21 considered with reference to the feed of the plate to the machine.

It will be noted that there are a different number of perforations in successive rows in each subgroup 11, the rows 12 and 20 containing the largest number while the central row 16 contains the least number, and also that the perforations in rows 12, 14, 16, 18 and 20 are staggered with reference to those in the rows 13, 15, 17 and 19, respectively. To effect this staggered arrangement, the plate 10 is passed through the machine twice, the first traverse producing the alternate rows 12, 14, 16, 18 and 20 in each subgroup 11 and the second traverse producing the intervening rows 13, 15, 17 and 19. Before beginning the second traverse, the plate is shifted slightly laterally and forward. However, as will be explained more in detail, if a pattern is desired in which the perforations in all rows are aligned transversely and lengthwise of the plate with any selected number of perforations in each row, this can be accomplished by one traverse, or if desired by two traverses.

Figure 1:
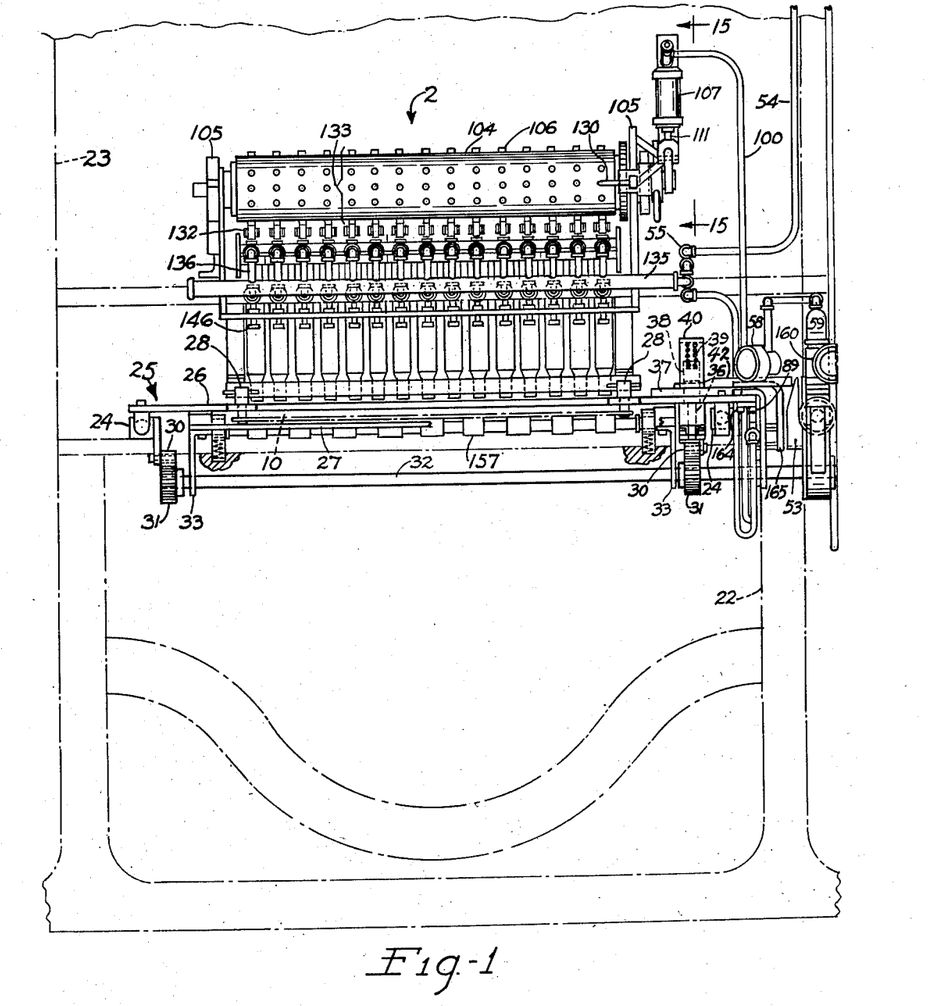
Fig. 1 is an end view of the machine as faced by the operator.
Figure 2:
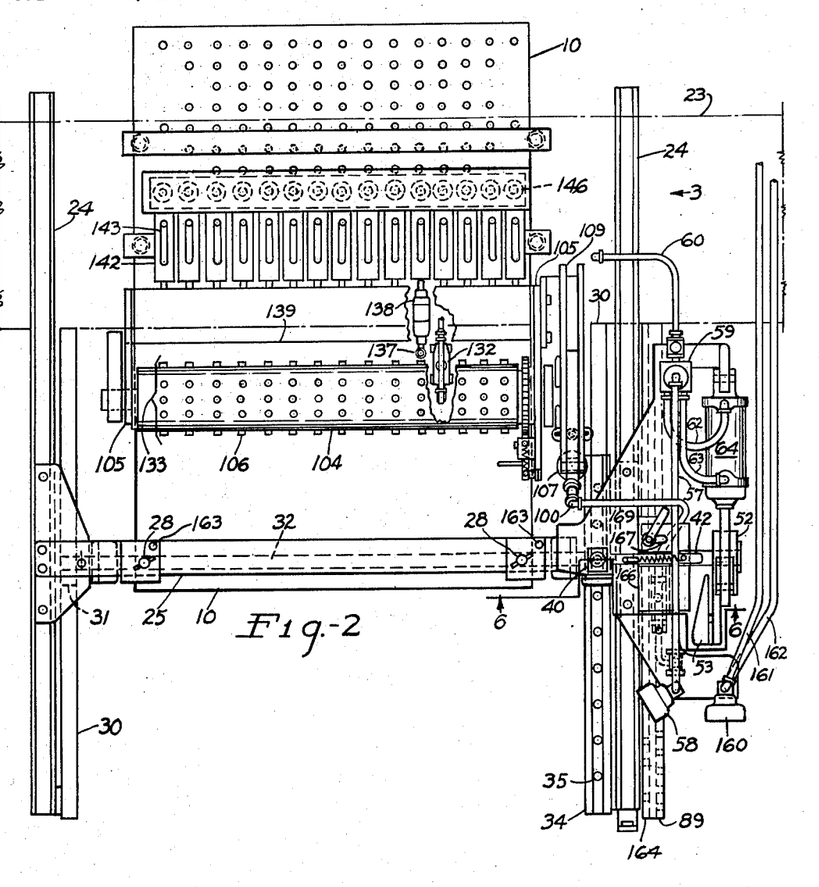
Fig. 2 is a plan view of the machine looking in the direction of the arrow 2 in Fig. 1, the plate carriage occupying an intermediate position between its beginning and terminal positions and the ram which actuates the punches being omitted.
Figure 3:
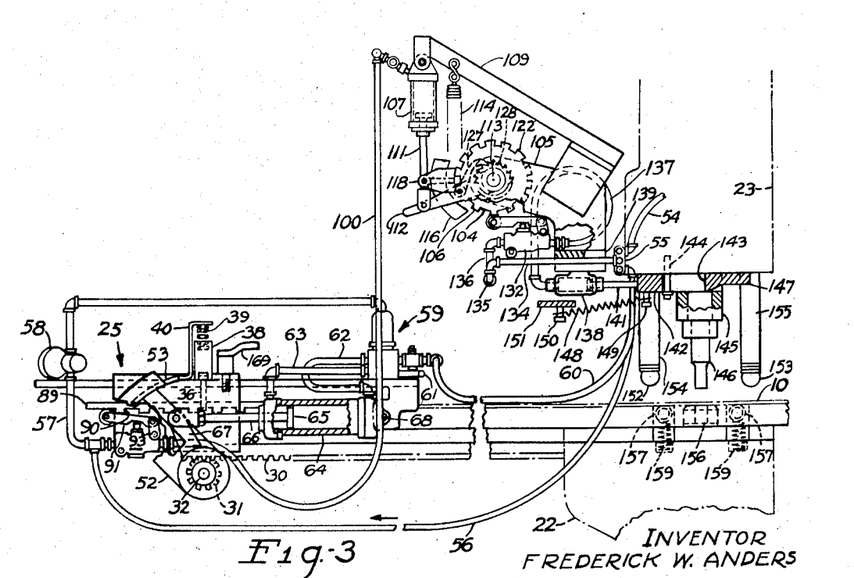
Figs. 3 and 4 are fragmentary side views, partly in section and looking in the direction of the arrow 3 in Fig. 2, showing, respectively, the positions of parts just prior to the punching of a row of perforations and subsequent to the release of the plate carriage for movement to the next punching position.

Referring to Figs. 1 to 3, the novel features of the machine are incorporated in a generally standard type of punch press including a bed 22 on which is mounted in the usual way a vertically reciprocating ram 23 whose movements are under the control of the operator as presently described. Extending forwardly from the ends of the bed 22 at a convenient height is a pair of spaced, horizontal, guide rails 24—24 and bridged therebetween and slidable thereon is a carriage 25 which supports the trailing end of the plate 10 and feeds the latter with a step-by-step movement to the successive perforating positions. To support the plate 10, the intermediate portion of the carriage 25 includes upper and lower strips 26 and 27, respectively (see Fig. 1), between which the plate is inserted edgewise to rest on the lower strip 27 and the trailing end of the plate is held in position relative to the carriage by means of a pair of locating pins 28—28 which extend downwardly through the upper strip 26 and through apertures 29—29 (see Fig. 14) adjacent the trailing corners of the plate, these apertures being drilled in the plate prior to the processing thereof. However, the plate 10 may be suitably clamped to the carriage 25.

A pair of spaced gear racks 30—30 are suspended from and parallel to the guide rails 24, respectively, adjacent the ends of the carriage 25 and meshing with the racks are gears 31—31 which are keyed to a shaft 32 that is supported by hangers 33—33 depending from the carriage. From Fig. 3, it will be apparent that, when the gears 31 are rotated counterclockwise as presently described, the carriage 25 is moved towards the ram 23 into successive perforating positions.

Figure 6:
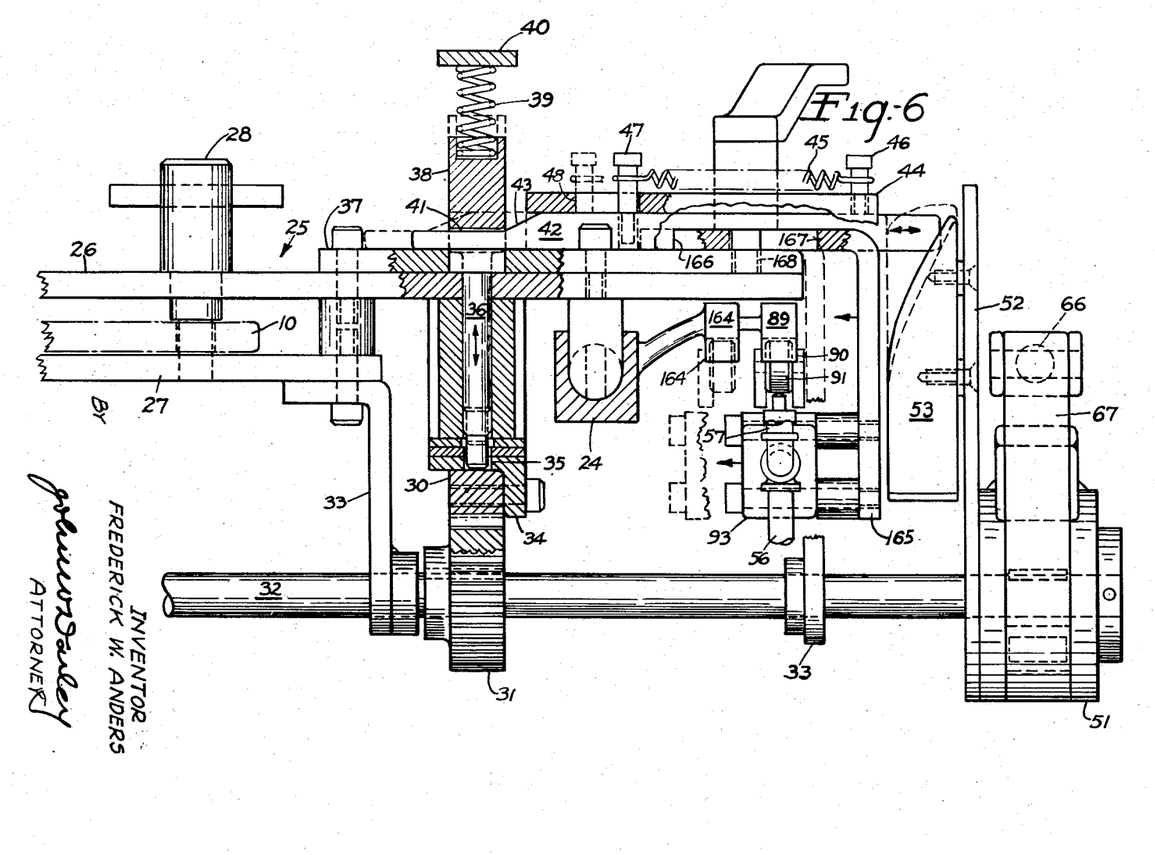
Fig. 6 is an enlarged section along the line 6—6 in Fig. 2 showing the releasing mechanism and immediately adjacent parts.

In each of the latter positions, the carriage 25 is held against inadvertent movement by the following instrumentalities. Referring to Figs. 2 and 6, the right hand rack 30 has attached to the upper side thereof an index rail 34 having apertures 35 spaced therealong to determine perforating positions of the carriage 25 and for receiving the lower end of a slidable index pin 36. This pin extends upwardly through and above the carriage strip 26 and an auxiliary plate 37 mounted on the upper side of the strip 26. Above the plate 37, the pin 36 is enlarged to form a head 38 whose upper end is engaged by one end of a spring 39 and the other end of this spring bears against a cage 40 which extends downwardly through the auxiliary plate 37 to rest on the strip 26. In the position of parts shown in Fig. 6, the lower end of the index pin 36 is biased into one of the apertures 35 in the index rail 34 thus locking the carriage 25 against movement.

To raise the pin 36, the head 38 is transversely slotted at 41 and extending therethrough is the reduced end of a cam finger 42 having an outwardly inclined cam surface 43. This finger is slidable endwise on the upper surface of the plate 37 in directions transverse to the movement of the carriage 25 and is retained for this movement by a housing 44 carried by the plate 37. Biasing of the finger 42 in the retracted position shown in Fig. 6 is effected by a spring 45, one end of which is attached to a fixed post 46 mounted on the housing 44 while the other end is secured to a post 47 which extends through an elongated slot 48 in the upper wall of the housing 44 for mounting in the cam finger 42.

Before the carriage 25 can be shifted from one perforating position to the next, the cam finger must be advanced to the dotted position shown in Fig. 6 to thereby lift the index pin 36 and the mechanism for accomplishing this result and the shifting of the carriage to its next perforating position will now be described.

Figure 7:
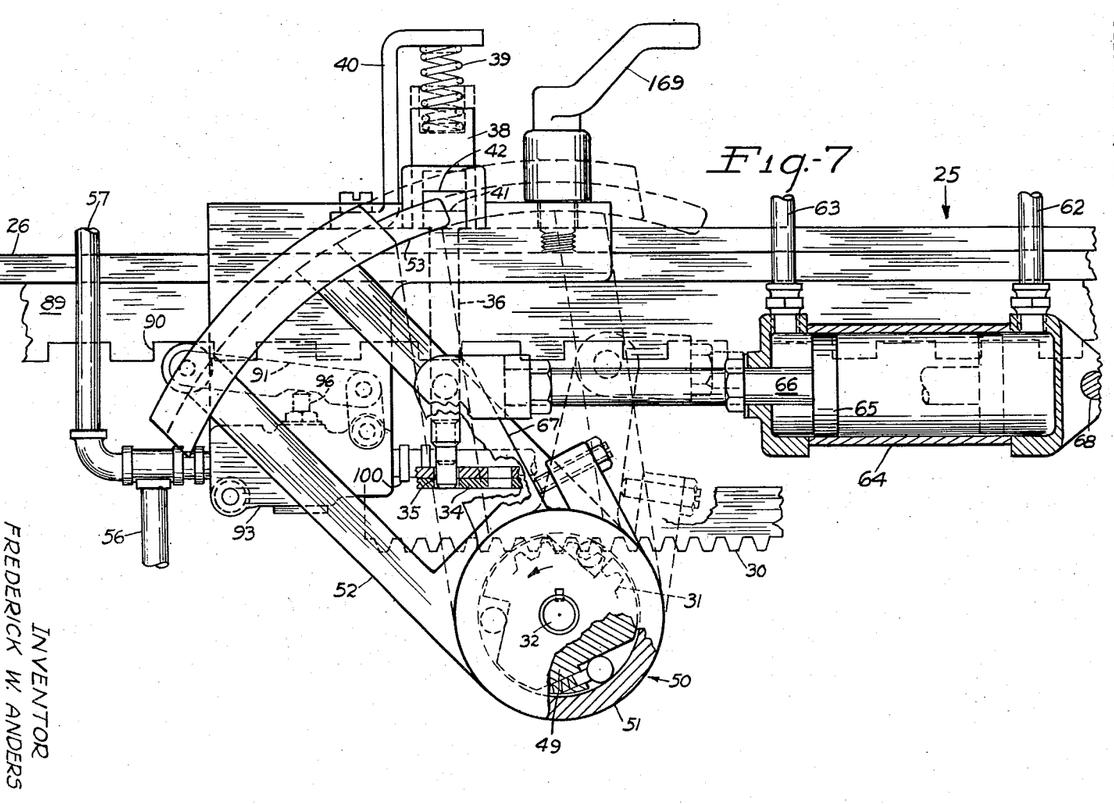
Fig. 7 is an enlarged side view, partly in section and as viewed in Fig. 3, of the mechanism for releasing and advancing the plate carriage to successive punching positions.

Referring to Figs. 6 and 7, the shaft 32 is extended to the side of the machine and has keyed thereto one element 49 of a typical overrunning clutch, designated generally by the numeral 50, which also includes a surrounding cooperating element constituting the hub 51 of a rock lever or arm 52. The arrangement is such that when the rock arm 52 is rotated clockwise to the dotted position shown in Fig. 7, the clutch 50 runs free, but when the rock arm is returned to the full line position, the clutch 50 locks and effects a counterclockwise rotation of the shaft 32 and a rolling of the gears 31—31 along the racks 30—30 with accompanying movement of the carriage 25 towards the ram 23. The outer end of the rock arm 52 carries an arcuate cam 53 which, when the arm 52 is rocked clockwise as viewed in Fig. 7, engages the adjacent end of the cam finger 42 to thereby shift the latter towards the left as viewed in Fig. 6 and raise the index pin 36 clear of the index rail 34. When the rock arm 52 is returned towards the full line position shown in Fig. 7, engagement of the cam 53 with the cam finger 42 is maintained long enough to insure a movement of the carriage 25 sufficient to prevent the pin 36 from returning to that aperture 35 which it previously occupied. The length of each movement of the carriage 25 is equal to the spacing between adjacent apertures 35 in the index rail 34.

Figures 4, 5:
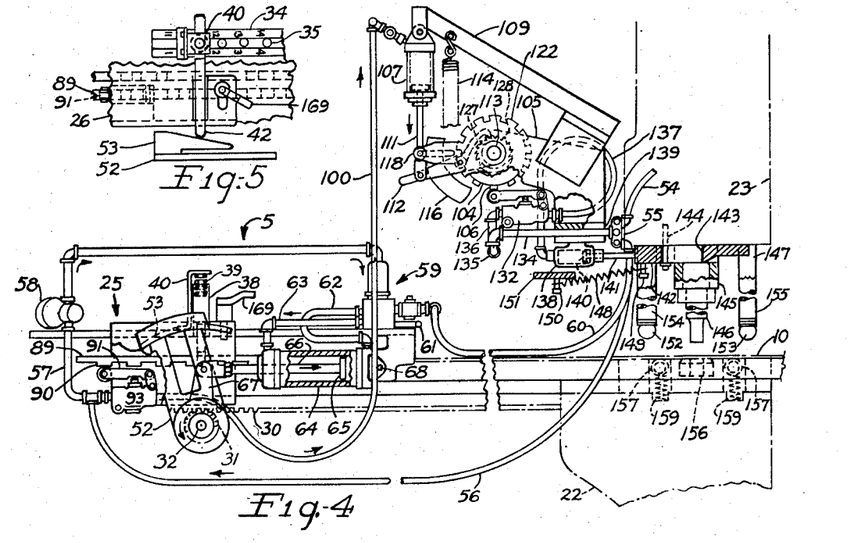
Fig. 5 is a fragmentary plan view, looking in the direction of the arrow 5 in Fig. 4, showing the releasing mechanism for the plate carriage.

Movement of the rock arm 52 is effected pneumatically under the control of the operator in the following manner, reference being had to Figs. 3 and 4. An air hose 54, connected to a source of air pressure, has its delivery end attached to a multiport fitting 55 suitably carried by the main frame of the machine and from one of the outlet ports of this fitting leads forwardly an air hose 56 which connects with a pipe 57 that moves with the carriage 25. A manually operated valve 58, biased to a closed position, is included in the pipe 57 at a point convenient to the operator and the terminus of the latter pipe connects with the top of a valve 59 presently described. An air hose 60 has its inlet connected to another outlet port of the fitting 55 and its opposite end communicates with one side of the valve 59 from which also extends an exhaust hose 61. The latter may be omitted if desired and its function performed by a port in the casing of the valve 59 as presently described.

A pair of hoses 62 and 63 connect with the opposite side of the valve 59 and their other ends connect with the opposite ends of a cylinder 64, all respectively mounted on the carriage 25 and within which is reciprocable a double acting piston 65. A piston rod 66 connects the piston 65 with an auxiliary rockarm 67 which has a common pivot with the rock arm 52 and moves therewith. Preferably, the mounting of the cylinder 64 is such as to permit a slight rocking movement as the piston 65 reciprocates and, for this purpose, the end of the cylinder opposite to that through which the rod 66 slides is pivoted at 68 on the carriage 25.

The valve 59 whose operation determines pressure admission to opposite sides of the piston 65 is more particularly shown in Fig. 12 to which reference will now be made. It includes a casing 69 having cavities 70, 71, 72 and 73 for receiving respectively the hoses 60, 61, 62 and 63, although as noted above, the hose 61 may be omitted so that the cavity 71, which serves as an exhaust, will communicate directly with the atmosphere. The central portion of the casing 69 is bored to provide a bottomed pocket 74 in which is fitted a cylindrical sleeve 75 having ports 76, 77, 78 and 79 which constantly connect the cavities 70, 71, 72 and 73, respectively, with the interior of the sleeve 75.

The top of the casing 69 carries a hollow cap 80 with which the delivery end of the air pipe 57 connects and reciprocable in this cap in alignment with the sleeve 75 is a piston 81 which is responsive in a downward direction to pressure admitted through the pipe 57. The piston 81 is carried on the upper end of a rod 82 which extends downwardly within the sleeve 75 and carries upper and lower, spaced, piston valves 83 and 84. When pressure is not present above the piston 81, the latter is biased to the upper position shown by a spring 85 interposed between the piston 81 and a disk 86 supported on an internal shouldered part of the sleeve 75.

Figure 12:
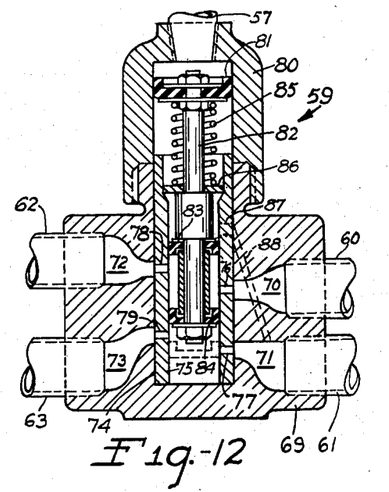
Fig. 12 is an enlarged, sectional elevation of the valve whose operation determines release and advance of the plate carriage to successive punching positions.

The relation of the piston valves 83 and 84 to the ports 76, 77, 78 and 79 is such that, with the valve conditioned as in Fig. 12, i. e., no pressure above the piston 81, the pressure hose 60 communicates with the hose 62 so that pressure is admitted to the cylinder 64 (see Figs. 3 and 7) to maintain the piston 65 in the left hand position shown, while the opposite side of the piston 65 communicates through the hose 63, and ports 79 and 77 with the exhaust cavity 71, the two latter ports being then unmasked by the piston valve 84.

Figure 13:
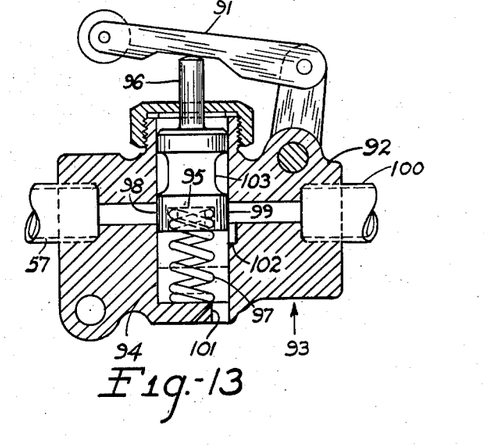
Fig. 13 is a schematic, sectional elevation of a valve which is employed in several locations in the machine, some being cam operated and others manually controlled to establish pneumatic pressure in the associated pipe or hose lines.

To admit pressure to the left side of the piston 65 to effect a clockwise rotation of the rock arm 52, the manually operated valve 58 is opened to admit pressure to the cap 80 above the piston 81. The valve 58 is of well known construction and its internal arrangement is such that, when in biased, closed position, the portion of the pipe 57 on the delivery side of the valve connects through the casing of the wave with the atmosphere, but in open position, the exhaust opening is closed and a full pressure condition is established throughout the pipe 57. The essentials of this type of valve are shown in Fig. 13 as presently described.

When pressure is applied to the piston 81, it is moved downwardly until the lower piston valve 84 occupies the dotted position shown in Fig. 12 which is below the port 79 but in masking relation to the exhaust port 77. The port 79 then communicates through the annular space between the piston valves 83 and 84 with the pressure port 76, while the piston valve 83 is then below the port 78 which communicates above the latter valve successively through a port 87 in the sleeve 75 and a passage 88 in the casing 69 with the exhaust cavity 71.

From the foregoing, therefore, it will be apparent that, when the valve 58 is opened, movement of the piston 65 towards the right rotates the rock arm 52 clockwise to thereby raise the index pin 36 and free the carriage 25 for movement, whereupon the operator releases the valve 58 for closure to thereby apply pressure to the opposite side of the piston 65 (see Figs. 3 and 7) and effect a shift of the carriage 25 by the interaction of the arm 52 and overrunning clutch. The pressure on the left side of the piston 65 is relieved through the valve 59. This carriage movement is limited by the dropping of the index pin 36 into the next aperture 35 in the index rail 34.

Associated with this intermittent carriage movement and triggered thereby is a mechanism for determining whether all of the punches are to operate to produce the maximum number of perforations in any row, or whether certain of the punches are to be prevented from operating.

Referring to Figs. 3 and 6, a fixed cam rail 89 is supported on the control side of the machine, i. e., the side on which the valve 58 is located, and from the lower side of this rail depend a plurality of cam lobes 90 spaced lengthwise along the rail. In the assumed conditions of the machine, the spacing of the lobes 90 is such as to determine, in conjunction with other parts presently described, the punching of perforations in rows 12, 14, 16, 18 and 20 of the plate 10. As the carriage 25 moves, each lobe 90 in succession engages the roller equipped end of a lever 91 whose opposite end is link connected in a pivotal manner to a casing 92 forming part of a valve 93 that moves with the carriage 25.

Referring to Fig. 13 which shows the details of the valve 93, the casing 92 includes a chamber 94 in which is reciprocable a piston valve 95 having a stem 96 which extends externally of the casing for constant contact with an intermediate part of the lever 91. The piston valve 95 is biased in this position by a spring 97 interposed between the piston valve and closed end of the chamber 94, the extension of the spring also serving to maintain the roller end of the lever 91 in contact with some part of the cam rail 89. The valve 93 also includes an inlet port 98 which constantly communicates with the air pipe 57 on the pressure side of the valve 58 (see Fig. 3) so that air pressure is always present in this port, and also with an outlet port 99 which constantly communicates with an air hose 100 leading to parts presently described. Still referring to Fig. 13, the closed end of the chamber 94 or on the spring side of the piston valve 95 includes an exhaust port 101 which connects with the atmosphere.

The position of the piston valve 95 in Fig. 13 is the same as that shown in Fig. 3, namely, it masks the inlet and outlet ports 98 and 99 so that pressure from the air pipe 57 is denied to the air hose 100 and the latter connects with the exhaust port 101 through a groove 102 in the side wall of the chamber 94. When the lever 91 is rocked by a cam lobe 90 to the position shown in Fig. 4, the piston valve 95 is shifted to the dotted position shown in Fig. 13 in which it masks the exhaust groove 102 and the air pipe 57 and air hose 100 are pressure connected around a reduced neck 103 above the piston valve. Return of the lever 91 to a position comparable to that shown in Fig. 3 as permitted by movement of the carriage 25 enables the spring 97 to restore the piston valve to the closed position shown in Fig. 13.

Details of the valve 93 as set forth above are illustrative of the manually operated valve 58, the only difference being the substitution of a button for the lever 91.

Continuing with the mechanism whose operation is initiated by opening of the valve 93, and referring to Figs. 1 to 4, a cam roll 104 is rotatably supported in spaced brackets 105—105 carried by the main frame of the machine above and in transverse relation to the movement of the plate to be perforated. Mounted in the peripheral surface of the cam roll 104 is a plurality of rows of detachable cam lobes 106 which are spaced circumferentially of the roll and with the lobes in each row being in alignment lengthwise of the roll. Further, the lobes 106 are also arranged in ring groups which are spaced lengthwise of the roll 104, with the lobes in each ring group lying in the same plane transversely of the roll as shown in Fig. 1.

Figures 8, 15:
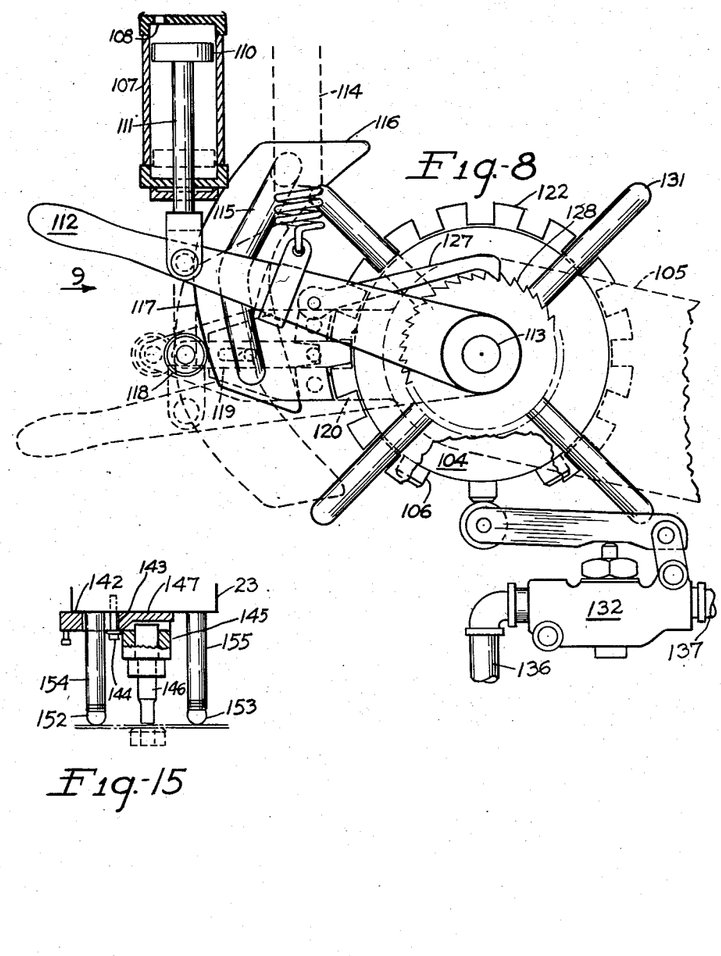
Fig. 8 is an enlarged elevation, partly in section and as viewed in Fig. 3, of the mechanism for indexing the cam roll which determines the selection of the punches which are to operate.
Fig. 15 is a fragmentary view, similar to Fig. 11, showing a gag block in retracted position to thereby disable the associated punch.

Whenever the valve 93 is opened to establish pressure in the air hose 100, mechanism responsive to such pressure is provided to index the cam roll to successive positions and will now be descried. Referring to Figs. 3, 4 and 8, the delivery end of the air hose 100 connects with the upper end of a cylinder 107 through a port 108 therein (see Fig. 8) and this cylinder end is pivotally supported on an arm 109 carried by one of the brackets 105 so that the cylinder hangs vertically.

Referring now more particularly to Fig. 8 which shows the indexing mechanism on a larger scale, a piston 110, responsive in a downward direction to pressure in the port 108, is reciprocable in the cylinder 107 and its rod 111 extends downwardly through the lower end of the cylinder for pivotal connection to a lever 112 that is freely journaled on the adjacent pintle 113 that extends from one end of the cam roll 104. The lever 112 is biased to the position shown in Figs. 3, 4 and 8 by a spring 114 whose opposite ends are respectively secured to the arm 109 and the lever 112.

Figures 9, 10:
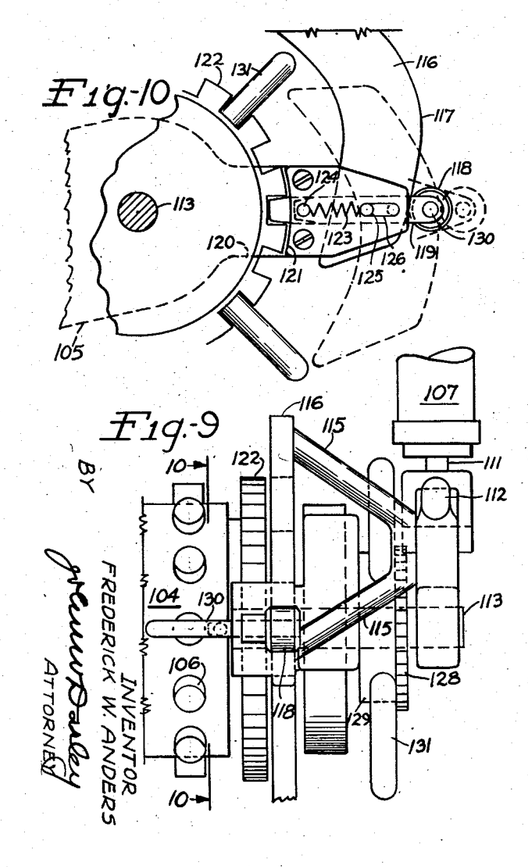
Fig. 9 is a fragmentary view looking in the direction of the arrow 9 in Fig. 8.
Fig. 10 is a view of the cam roll mechanism taken along the line 10—10 in Fig. 9 and looking in the direction of the arrows.

As shown in Figs. 8 and 9, the lever 112 is set substantially beyond the adjacent end of the cam roll 104 and positioned between these parts and supported by struts 115—115 carried by the lever 112 is a generally arc shaped, flat cam plate 116 whose outer edge surface 117 is eccentric to the surface of the roll. Riding on the surface 117 is a roller 118 carried by the outer end of a lock pin 119 which is slidable in a channel formed by complementary parts of an extension 120 on the bracket 105 and a plate 121 (see Fig. 10) secured thereto. The inner end of the lock pin 119 is engageable with a peripherally toothed disk 122 which rotates with the cam roll 104 and the pin is biased in this position by means of a spring 123 whose opposite ends are respectively secured to a pin 124 mounted on the plate 121 and a pin 125 carried by the lock pin 119 and reciprocable in a slot 126 provided in the plate 121. The lock pin 119 holds the cam roll 104 in each position to which it is sucecssively indexed as presently described.

In the position of the several parts shown in Figs. 8 to 10, pressure is lacking above the piston 110 so that the lever 112 and cam plate 116 occupy the full line positions and the roller 118 contacts that part of the cam surface 117 which is closest to the axis of the cam roll 104. The lock pin 119 is then fully engaged with the disk 122. When pressure is established above the piston 110, i. e., by opening of the valve 93, the lever 112 and cam plate 116 are moved downwardly in a counterclockwise direction to the positions shown dotted in Fig. 8. This movement rides the roller 118 along the cam surface 117 so that in the dotted position, it is located at a greater distance from the axis of the roll 104 to thereby retract the lock pin 119 from engagement with the toothed disk 122.

The cam roll 104 is now free to be indexed to the next position. After the lever 91 (see Figs. 4 and 13) has cleared the adjacent cam lobe 90, the valve 93 closes and the pressure in the air hose 100 and in the space above the piston 110 (see Fig. 8) exhausts through the port 101. The spring 114 then returns the lever 112 to the full line position in Fig. 8 and it is during this movement that the cam roll 104 is indexed to its next position. For this purpose, one end of a pawl 127 (see Fig. 8) is pivoted to an intermediate part of the lever 112 and the opposite end rides on a ratchet portion 128 provided on the periphery of a disk 129 keyed to the pintle 113. The several parts are so related that a full stroke of the piston 110 in a downward direction as viewed in Fig. 8 will move the pawl 127 a distance such that on the upstroke of the piston, the pawl will clockwise rotate the cam roll an arcuate distance equal to that between adjacent rows of cam lobes 106.

Occasionally, it may be desirable to manually rotate the cam roll to any desired position and, for this purpose, the pin on which the roller 118 is mounted is extended to provide a hand grip 130 (see Figs. 9 and 10) whereby the lock pin 119 may be manually retracted and the disk 129 carries a plurality of radial arms 131 whereby the roll 104 may be manually rotated.

In each indexed position of the cam roll 104, one lobe 106 of each ring group thereof, unless previously detached as presently explained, extends vertically downward (see Figs. 3, 4 and 8) for actuating a lever-valve unit 132 which is identical with the like unit shown in Fig. 13, there being one such unit for each ring group identified by the numeral 133 (see Figs. 1 and 2). An air pipe 134 connects the supply fitting 55 with a manifold 135 which extends transversely of the machine beneath the cam roll 104 and extending upwardly from the manifold is a plurality of air branch pipes 136, each of which connects with the inlet of one of the lever-valve units 132. The outlet of each of the latter units connect by a hose 137 (see Figs. 3 and 4) with one end of a horizontal cylinder 138 and all of the latter are supported by a cross member 139.

Reciprocable in each cylinder 138 is a piston 140 which is responsive to pressure in the hose 137 and its rod 141 extends through the opposite end of the cylinder for connection with a gag block 142 which is slidable along the under surface of the ram 23. Specifically, each gag block 142 is finger-like in shape and includes in the thicker portion thereof an elongated slot 143 through which extends a pin 144 carried by the ram 23. Each gag block 142 is also slidable through a carrier 145 which depends from the under side of the ram 23 and extends along the length thereof. Vertically slidable in this carrier is a gang punch assembly including a plurality of aligned punches 146, each being in operative relation to a companion gag block 142 thereabove whose position determines whether the associated punch 146 will perforate when the ram 23 moves downwardly.

The end of each block 142 opposite to its connection with the piston rod 141 is reduced in thickness at 147 for a convenient distance from the adjacent end thereof so that when the block is in the retracted position shown in Fig. 15 under conditions presently noted, this reduced portion lies above the associated punch 146 and is spaced from the upper end thereof. Hence, when the ram 23 descends and this particular punch contacts the plate 10, the absence of backing above the punch results in the latter sliding upward so that the punch in question does not perforate. However, when a gag block 142 is in the advanced position shown in Figs. 3, 4 and 11, then the thicker portion of such block provides full backing for the associated punch which performs its normal function when the ram 23 descends. Each block 142 is biased towards the retracted position shown in Fig. 15 by a spring 148 whose ends are respectively attached to a pin 149 carried by the block and a pin 150 carried by a fixed plate 151.

Before describing the sequence of operations necessary to produce a plate having the perforation pattern shown in Fig. 14, reference will be made to certain features which are directed to preserving the flatness of the plate 10 during the punching operation and to facilitating the movement of the plate after each such operation.

Figure 11:
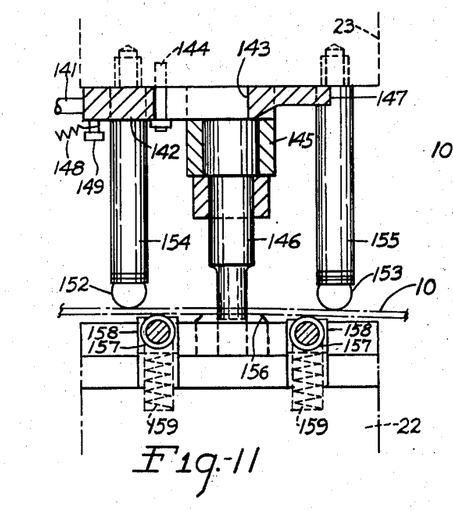
Fig. 11 is an enlarged, fragmentary view, partly in section, of a punch, of the device for slightly bending the plate on the far side of the punch at the instant of perforation to counteract stresses set up in the punched area, and of the spring actuated bars for lifting the plate so that the burred portions thereof will clear the dies when the plate is advanced to the next position, all as viewed in Fig. 4.

Referring to Fig. 11, bars 152 and 153, shaped on their under sides to present particular surfaces to the plate 10, extend transversely of the machine on opposite sides of the line of punches 146, i. e., forward and aft of the punches considered with respect to the movement of the plate 10 and sufficiently close to the punches to insure the operation presently described. The bars 152 and 153 are respectively carried by a plurality of posts 154 and 155 depending from the ram 23, the posts 155 being slightly longer than the posts 154 for a purpose which will now be explained.

In the perforating position shown in Fig. 11 and considering one punch 146 which has passed through the plate 10 and into a female die 156 carried by the bed 22, the bar 152 contacts the plate 10 forwardly of the punch so that the plate rests uniformly on the top of the die 156, but the additional length of the posts 155 causes the bar 153 to slightly deflect the plate beyond or aft of the punch, this relation being exaggerated in Fig. 11. The purpose of this arrangement is to counteract the stresses set up in the perforated zone and to resist the tendency towards deformation set up by the perforating operation. The construction is particularly desirable where, as in the present instance, a row of perforations is simultaneously punched across the plate.

The other additional feature relates to insuring free traverse of the plate 10 after each perforation thereof. The cutting of the perforations forms a downwardly extending burr around at least a part of each edge thereof which would prevent subsequent edgewise movement of the plate by locking with the dies. To prevent this possibility, rollers 157 are disposed forwardly and aft of the line of dies 156 and extend across the machine, the ends of the rollers being journaled in blocks 158 which rest on springs 159 suitably mounted in pockets in the bed 22. During the perforating operation, the rollers 157 are depressed by the plate 10 due to the pressure exerted by the bars 152 and 153, but when the ram 23 is raised, the extension of the springs 159 causes the rollers 157 to lift the plate 10 sufficiently for the burrs to clear the dies 156 so that the plate 10 may be advanced to the next perforating position.

In describing the operation of the machine, it will be assumed that the trailing end of the plate 10 has been mounted in the carriage 25 and secured thereto by the locating pins 28 as described above and shown in Figs. 1 and 2, and that the leading edge of the plate is located at such a distance beyond the line of punches 146 as will locate the first row of perforations 12 (see Fig. 14). The carriage 25 can be shifted manually to the above position by manually lifting the index pin 36, or can be power shifted as described above by operating the valve 58.

The several parts will then occupy the relative positions shown in Fig. 3, i. e., the lever 91 engages the cam rail 89 between a pair of adjacent lobes 90, the lever part of each lever-valve unit 132 engages the associated cam lobe 106 so that this unit is in open position to thereby hold the companion gag block 142 in advanced or punching position, and that the ram 23 is in the raised position shown. The operator then opens a valve 160 (see Fig. 2) which is mounted on the carriage 25 adjacent the valve 58 and connects through air hoses 161 and 162 with mechanism for effecting in the usual manner a down stroke of the ram 23 and an up stroke thereof. This mechanism is well known, forms no part of the invention and is not shown in the drawings.

Since for the perforation pattern shown in Fig. 14, the first row 12 contains the largest number of perforations, or fifteen in the assumed situation, there is a corresponding number of cam lobes 106 in the associated lobe row on the cam roll 104 so that all punches 146 function when the ram 23 descends.

The operator then opens the valve 58 to thereby advance the carriage 25 in the manner described above a distance equal to that between an adjacent pair of apertures 35 in the index rail 34, which distance is equal to the spacing between the alternate perforation rows 12, 14, 16, 18 and 20 in the subgroup pattern 11 (see Fig. 14). This carriage movement also rotates the cam roll 104 as described above to the next indexed position which brings the next row of cam lobes 106 into opening relation to the lever-valve units 132. The plate 10 is now in position for the punching of the perforation row 14, but since this row contains two less perforations than the row 12, it will be understood that prior to commencing operations on the plate 10, one lobe 106 would have been removed from each end of the last named lobe row whereby the associated lever-valve units 132 assume a closed position and the companion gag blocks 142 are shifted to the retracted position shown in Fig. 15. The punches 146 which are operably related to the last named blocks 142 are accordingly disabled so that when the ram 23 descends, only thirteen perforations will be punched in the row 14 and they will be related to the perforations in the row 12 as shown in Fig. 14.

The above operations are repeated for the perforation rows 16, 18 and 20 with the following proviso relative to the prior conditioning of the cam roll 104 as to the lobes 106 thereof. For the perforation row 16, two lobes 106 are removed from each end of the associated lobe row, while one lobe is removed from each end of the lobe row for producing the perforation row 18. Perforation row 20 contains the same number of perforations as row 12 so the number of lobes along the roll 104 for the former is the same as for the latter, only the rows being different in the latter instance.

The punching of the perforations in successive subgroup patterns 11 proceeds in the same manner as above. Whenever a cam lobe 106 is removed, the punch 146 associated therewith will not function.

To punch the perforations in the intervening rows 13, 15, 17 and 19 whose perforations are staggered with respect to those in the other rows, the carriage 25 is first manually returned to the starting position shown in Fig. 3, the locating pins 28 are removed and the plate 10 is shifted slightly forward or towards the ram 23 and to the right, as viewed in Figs. 2 and 14, until its locating apertures 29—29 register with apertures 163—163 (see Fig. 2) in the upper carriage strip 26. The pins 28 are then reinserted through these aligned apertures and the carriage 25 is moved to the position for punching the perforation row 13 as determined by the cooperation of the index pin 35 and the appropriate index aperture 35.

The lateral shifting of the plate 10 insures that when the ram descends, the perforations punched to form the row 13 will be staggered with reference to those in the row 12 or, in other words, the perforations in the row 13 will lie opposite the spaces between the perforations in the row 12, respectively. For the particular subgroup pattern 11 shown, the perforations in the perforation row 13 number fourteen which requiers the prior removal of one lobe 106 from the left end, as faced by the operator, of that row of such lobes which determine the number of punches 146 for producing the apertures in row 13. For the perforation rows 15 and 17, each including twelve perforations, the appropriate cam lobe rows will each lack two lobes 106 from the left end and one lobe from the right end, while the perforation row 19, being identical with the row 13, will have its cam lobe row conditioned as for the perforation row 13.

The machine is preferably conditioned so that during the first traverse of the plate to produce the perforation rows 12, 14, 16, 18 and 20, the cam roll 104 rotates through 180° and completes its rotation at the end of the second traverse of the plate. This arrangement, however, may be varied for obvious reasons.

In the perforating of a plate having the repeated pattern arrangement shown in Fig. 14, the regular spacing of the lobes 90 on the cam rail 89 produces successive indexings of the cam roll 104 which, in conjunction with the lobe arrangement on this roll produces the pattern. However, since the perforation rows 15 and 17 each include twelve perforations, and these are successive rows in the second traverse of the plate, it is possible to improve the versatility of the machine for the particular pattern and others by employing an additional cam rail 164 (see Fig. 6) parallel to and located inwardly of the cam rail 89. The valve 93 and its associated lever 91 are then carried by a hanger 165 having a wing 166 slidable on the plate 37 and including a slot 167 for receiving a stud 168 mounted in the latter plate. A nut 169 threaded on the stud 168 holds the wing in either the full or dotted positions shown in Fig. 6.

At the beginning of the second traverse of the plate 10 under the assumed condition, the hanger 165 would be shifted to the dotted position shown in Fig. 6 wherein the lever 91 would be operably related to the cam rail 164. The spacing of the lobes 170 along this rail would be different from the regular spacing of the lobes 90 along the cam rail 89 as shown in Fig. 7. When the plate 10 reaches the position for punching perforation row 15, the cam roll 104 would have been indexed by an appropriately located lobe 170 on the cam rail 164 to determine the proper number of punches to operate, namely, twelve, but when the plate reaches the position of perforation row 17 which is to also include twelve perforations, there would not be any necessity for further indexing the roll 104. Hence, there would not be any lobe 170 on the rail 163 at the corresponding operating point and the ram 23 would punch twelve perforations in the row 17. In other words, the cam roll 104 is indexed only when the valve 93 is opened by a cam lobe on either the cam rail 89 or the rail 164, and where not indexed, the punches 146 will cut perforations as determined by the immediately previous indexed position of the roll.

When the machine is once conditioned by means of either the cam rail 89, or the cam rail 164, or both, with appropriate lobe spacing along either or both of these rails, plus lobe arrangement on the cam roll 104 for any particular perforation pattern, the plates may be processed at a high production rate and low unit cost, and substantially free of any deformation. The machine is controlled by a single operator and, except for the manual actuation of the valves 58 and 160, is entirely automatic in operation. Further, the machine is not restricted to providing a plate with staggered perforations, but will also cut perforations in which the latter are aligned lengthwise and crosswise of the plate according to any marginal outline.

The term "plate," as employed in the claims, is intended to include those elements having thicknesses commonly regarded as possessed by plates and also to include substantially thinner elements which are usually denoted as "sheets," both without limitation as to the component material.

I claim:

1. A machine for making spaced, parallel rows of perforations in a flat plate comprising a plurality of aligned punches movable into and out of cutting position, a carriage connectible to the plate for shifting the same to successive cutting positions, means for positively locking the carriage during the perforation of each row including a fixed, spaced apertured rail and a pin movable between positions engaging any aperture and free thereof, means including a member successively movable in one direction to release the locking means and in the opposite direction to advance the carriage to the next cutting position, pneumatic means selectively controlled for determining movements of the member, and means triggered by the carriage movement for disabling selected punches to thereby vary the number of perforations in any row of the plate.

2. A machine for making spaced, parallel rows of perforations in a flat plate comprising a reciprocable ram, a plurality of aligned and individually movable punches carried and actuated by the ram into and out of cutting position, a carriage for moving the plate into successive positions for cutting, and having gear means meshed with a fixed rack, means for locking the carriage during the perforation of each row, a rock arm connectible with and freely movable in one direction to release and in the opposite direction to reengage the locking means, respectively, and having a one-way clutch connection to the gear means when moved in said opposite direction for advancing the carriage to the next cutting position, the connection of the rock arm to the locking means being such that when the rock arm is moved in said opposite direction reengagement of the locking means is delayed until the carriage has shifted, a plurality of elements slidably carried by the ram and shiftable between positions providing a backing and non-backing for the punches corresponding to cutting and non-cutting positions of the punches when the ram moves to perforating position, a cam roll extending transversely of the machine parallel to the line of punches and having on the surface thereof aligned rows of detachable cam lobes extending lengthwise and spaced circumferentially of the roll whereby the roll may be initially conditioned for any desired number of lobes in each row on the roll, means responsive to carriage movement for rotatably indexing the roll to successively present the rows of lobes, and means responsive to the presented rows for determining positions of selected individual elements to thereby vary the number of perforations in any row of the plate.

3. A machine for cutting perforations in a flat plate comprising a plurality of aligned punches movable into and out of cutting position, a carriage connectible to the plate for shifting the same to successive cutting positions, a fixed gear rack, means for locking the carriage to the gear rack during the cutting operation, a gear supported from the carriage and meshing with the rack, a rock arm having a one-way connection with the gear and operably related to the locking means in such a way that movement of the rock arm in one direction releases the locking means and in the opposite direction successively rolls the gear along the rack to place the carriage in the next cutting position and reengages the locking means, and means controlled by the carriage movement for disabling selected punches to thereby vary the number of perforations in any row of the plate.

4. A machine for making spaced, parallel rows of perforations in a flat plate comprising a plurality of aligned punches movable into and out of cutting position, a carriage connectible to the plate for shifting the same to successive cutting positions and having gear means meshed with a fixed rack, means for locking the carriage during the perforation of each row, a rock arm connectible with and freely movable in one direction to release and in the opposite direction to reengage the locking means, respectively, and having a one-way clutch connection to the gear means when moved in said opposite direction for advancing the carriage to the next cutting position, the connection of the rock arm to the locking means being such that when the rock arm is moved in said opposite direction reengagement of the locking means is delayed until the carriage has shifted, and means triggered by the carriage movement for determining the operation of selected punches.

5. A machine for making spaced, parallel rows of perforations in a flat plate comprising a plurality of aligned punches movable into and out of cutting position, a carriage connectible to the plate for shifting the same to successive cutting positions and having gear means meshed with a fixed rack, means for locking the carriage during the perforation of each row, a rock arm connectible with and freely movable in one direction to release the locking means and having a one-way clutch connection to the gear means when moved in the opposite direction for advancing the carriage to the next cutting position, and means triggered by the carriage movement for determining the operation of selected punches.

6. A machine for making spaced, parallel rows of perforations in a flat plate comprising a plurality of aligned punches movable into and out of cutting position, a carriage connectible to the plate for shifting the same to successive cutting positions and having gear means meshed with a fixed rack, means for locking the carriage during the perforation of each row, a rock arm connectible with and freely movable in one direction to release the locking means and having a one-way clutch connection to the gear means when moved in the opposite direction for advancing the carriage to the next cutting position, a plurality of elements slidable between positions providing backing and non-backing for the punches corresponding to cutting and non-cutting positions of the punches, and means triggered by the carriage movement for determining the positions of the elements.

References Cited in the file of this patent

UNITED STATES PATENTS

| | | |
|---|---|---|
| 772,826 | Reynders et al. | Oct. 18, 1904 |
| 934,672 | Kilgore | Sept. 21, 1909 |
| 977,362 | Banning | Nov. 29, 1910 |
| 1,141,221 | Thomas | June 1, 1915 |
| 1,241,248 | Payne | Sept. 25, 1917 |
| 1,506,424 | Hancock | Aug. 26, 1924 |
| 1,925,034 | Fitzgerald | Aug. 29, 1933 |
| 2,394,346 | Weidman | Feb. 5, 1946 |